(12) United States Patent
Purvis

(10) Patent No.: US 12,027,066 B2
(45) Date of Patent: Jul. 2, 2024

(54) BIOMECHANICAL MODEL SYSTEM

(71) Applicant: Thomas C Purvis, Oklahoma City, OK (US)

(72) Inventor: Thomas C Purvis, Oklahoma City, OK (US)

(*) Notice: Subject to any disclaimer, the term of this patent is extended or adjusted under 35 U.S.C. 154(b) by 660 days.

(21) Appl. No.: 17/225,516

(22) Filed: Apr. 8, 2021

(65) Prior Publication Data
US 2021/0319720 A1   Oct. 14, 2021

Related U.S. Application Data

(60) Provisional application No. 63/007,443, filed on Apr. 9, 2020.

(51) Int. Cl.
*G09B 23/32* (2006.01)
*G09B 23/34* (2006.01)

(52) U.S. Cl.
CPC ............. *G09B 23/32* (2013.01); *G09B 23/34* (2013.01)

(58) Field of Classification Search
CPC ........ G09B 23/30; G09B 23/32; G09B 23/34; A63H 3/46; A63H 7/02; A63H 11/06; A63H 11/10; A63H 11/14; A63H 11/18
USPC ........ 434/267, 274, 275; 446/308, 309, 312, 446/317, 371, 375, 377, 379, 380, 381, 446/383
See application file for complete search history.

(56) References Cited

U.S. PATENT DOCUMENTS

| | | | | |
|---|---|---|---|---|
| 2,165,473 A | * | 7/1939 | Greneker | A47F 8/00 223/68 |
| 4,041,638 A | | 8/1977 | Knibbs | |
| 4,701,132 A | | 10/1987 | Groesch et al. | |
| 4,850,877 A | * | 7/1989 | Mason | G09B 23/30 434/274 |
| 4,989,862 A | * | 2/1991 | Curtis | A63B 69/0071 473/448 |
| 5,443,188 A | * | 8/1995 | Kotlarsky | A63H 11/18 223/66 |
| 6,532,400 B1 | * | 3/2003 | Jacobs | F15B 11/20 318/568.17 |

(Continued)

OTHER PUBLICATIONS

Screen captures from YouTube video entitled "Suats Part 1: Fold-Ability and Proportions", 10 pages, uploaded Feb. 2, 2015, by user "PersonalTrainingdotcom". Retrieved from https://youtu.be/Av3LO2GwpAk.

*Primary Examiner* — Joseph B Baldori
(74) *Attorney, Agent, or Firm* — Sean O'Connell, PLLC

(57) ABSTRACT

A biomechanical system for illustrating body mechanics. The system includes components representing the torso, upper leg, and lower leg which can be altered in length to represent the variations in human segmental proportions and their combined influences on an individual's mechanical ability to move between a standing position and a seated or squatting position. Manipulation of these variables is further influenced by a range of available mobility of respective joints interconnecting the body segments. Outcomes of permutations of both the variations in segmental proportions and joint mobility is further influenced by variations in the relative plane of gross lower extremity motion as demonstrated by manipulation of a secondary hip axis. The system also incorporates various muscle segments to demonstrate impact of body movements on muscles and restrictions that muscles may present for body movements.

9 Claims, 4 Drawing Sheets

(56) References Cited

U.S. PATENT DOCUMENTS

| | | | |
|---|---|---|---|
| 6,769,286 B2 | 8/2004 | Biermann et al. | |
| 7,384,268 B2* | 6/2008 | Browne-Wilkinson | G09B 23/32 |
| | | | 434/274 |
| 7,597,017 B2* | 10/2009 | Bedard | G09B 23/32 |
| | | | 623/47 |
| 7,699,615 B2* | 4/2010 | Sakezles | G09B 23/28 |
| | | | 434/274 |
| 7,748,984 B2* | 7/2010 | McAllister | G09B 23/30 |
| | | | 434/274 |
| 8,425,234 B2* | 4/2013 | Sakezles | G09B 23/32 |
| | | | 434/274 |
| 8,469,715 B2 | 6/2013 | Ambrozio | |
| 9,097,325 B2* | 8/2015 | Zhu | B62D 57/02 |
| 9,283,673 B2* | 3/2016 | Godowski | B25J 9/106 |
| 2005/0059908 A1* | 3/2005 | Bogert | A63B 21/055 |
| | | | 601/5 |
| 2008/0255488 A1* | 10/2008 | Agrawal | A63B 69/0064 |
| | | | 623/24 |
| 2010/0185301 A1* | 7/2010 | Hansen | A61F 2/70 |
| | | | 623/47 |
| 2011/0027767 A1* | 2/2011 | Divinagracia | G09B 23/32 |
| | | | 434/274 |
| 2011/0066088 A1* | 3/2011 | Little | A61H 3/00 |
| | | | 601/35 |
| 2011/0297461 A1* | 12/2011 | Miyazaki | B62D 57/032 |
| | | | 901/1 |
| 2014/0190289 A1* | 7/2014 | Zhu | B62D 57/02 |
| | | | 74/89.22 |

* cited by examiner

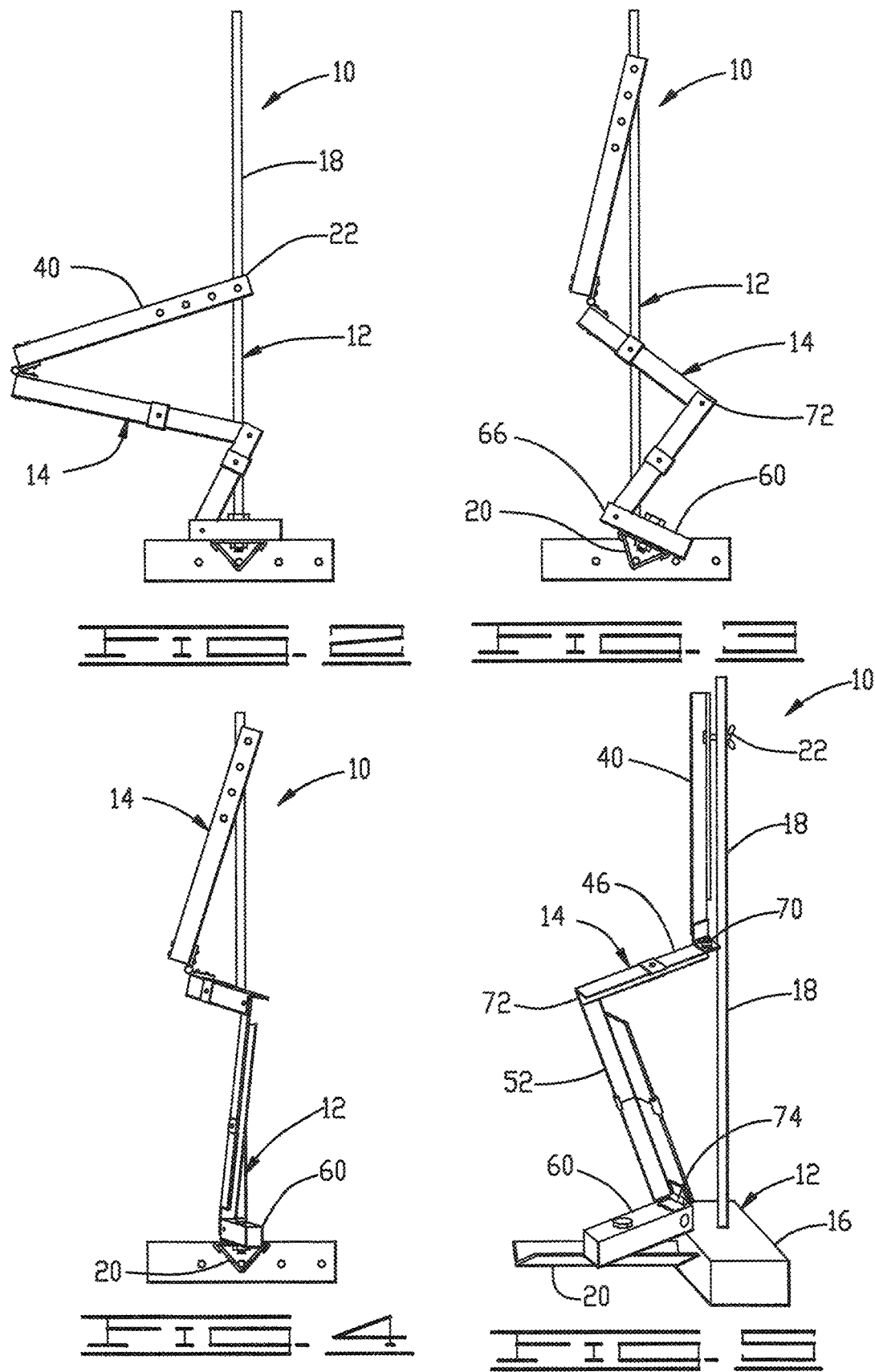

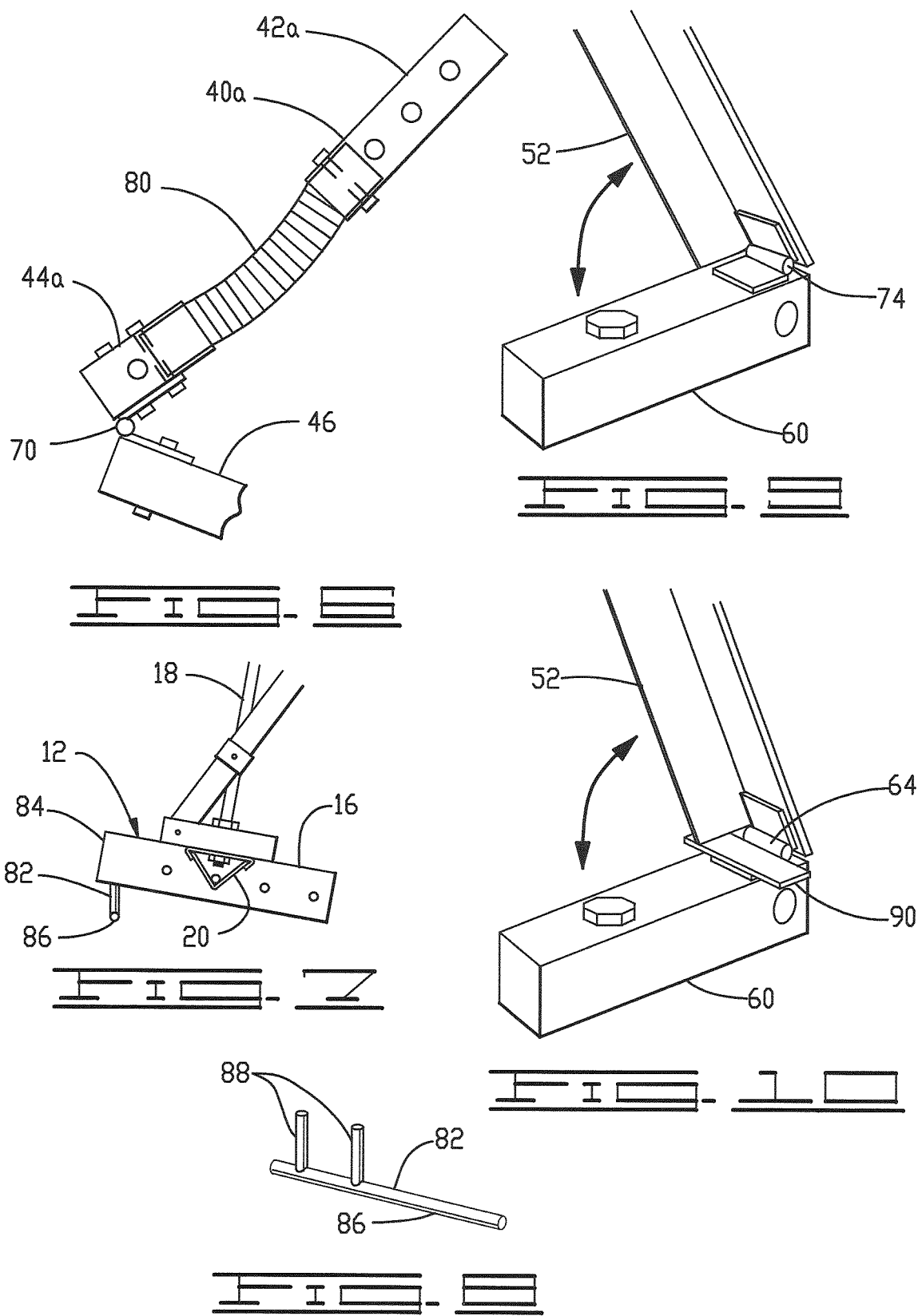

BIOMECHANICAL MODEL SYSTEM

FIELD OF THE INVENTION

The present invention relates to biomechanical models of and more particularly to biomechanical models for demonstrating body mechanics during exercise movements.

SUMMARY OF THE INVENTION

The biomechanical model system of the present invention comprises components representing the torso, upper leg, and lower leg which can be altered in length. The adjustable components represent the variations in human segmental proportions and their combined influences on an individual's mechanical ability to move to and from a standing position to and from a seated or squatting position. The manipulation of these variables is further influenced by an individual's range of available mobility of the respective joints interconnecting the body segments. The outcomes of the permutations of both the variations in segmental proportions and variations in respective joint mobility is shown to be further influenced by variations in the relative plane of gross lower extremity motion as demonstrated by incremental manipulation of a multiaxial hip joint. In addition to the innate skeletal proportions and ranges of an individual as well as lower extremity positioning decisions, the model can demonstrate external influences such as load placement upon the body, the percentage of load to bodyweight, and/or the change in position of the foot heel relative to the toes. Additional influences of devices such as specific machines and their restraint to overall paths of motion and foot placement variations during their use can also be demonstrated.

The present invention comprises a biomechanical system comprising a pedestal and a biomechanical body model. The pedestal comprises a base and a vertical post. The biomechanical body model comprises a torso segment having a top end and a bottom end, an upper leg segment having a first end and a second end, a lower leg segment having an upper end and a lower end, a foot segment connected to the base. The top end of the torso segment is removably connected to the post. The body model further comprises a hip joint connected to the bottom end of the torso segment and the upper leg segment, a knee joint connected to the upper leg segment and the lower leg segment, and an ankle joint connected to the lower leg segment and the foot segment. The hip joint of the body model comprises a multiaxial joint. The knee joint and the ankle joint are single axis joints.

BRIEF DESCRIPTION OF THE DRAWINGS

FIG. 2 is an elevation view of the model of FIG. 1 in an alternative configuration.

FIG. 3 is an elevation view of the model of FIG. 1 in another alternative configuration.

FIG. 4 is an elevation view of the model of FIG. 1 in another alternative configuration.

FIG. 5 a perspective view of the model as shown in FIG. 4.

FIG. 6 is a partial view of the model showing an alternative embodiment of a torso segment.

FIG. 7 is a partial view of the model showing an alternative embodiment of the pedestal.

FIG. 8 is an illustration of a lift support for use with the embodiment shown in FIG. 7.

FIG. 9 is a partial view of the model showing the lower leg segment and the foot segment.

FIG. 10 is a partial view of the model showing a dorsiflexion block employed with the foot segment.

DETAILED DESCRIPTION

Personal trainers, physical therapists, healthcare professionals, and other exercise professionals regularly work with individuals to improve health through exercise and activities of daily living. Understanding exercise mechanics, including the combined influences of an individual's idiosyncratic skeletal proportions, joint limitations, and choices of exercise set-up and execution can be critical to exercise outcomes and proper exercise techniques. An innovative biomechanical model capable of simultaneously manipulating in strategic degrees the combinations and permutations of skeletal proportions, joint limitations, external loading influences in various positions and planes in which human movement may be performed can be advantageously used to demonstrate how various exercise movements can impact various joints, muscles, and overall ability to perform an activity. The embodiments of the present invention are particularly useful for demonstrating exercise mechanics of squats and other related exercises and functional movements of daily living.

Figure 1:
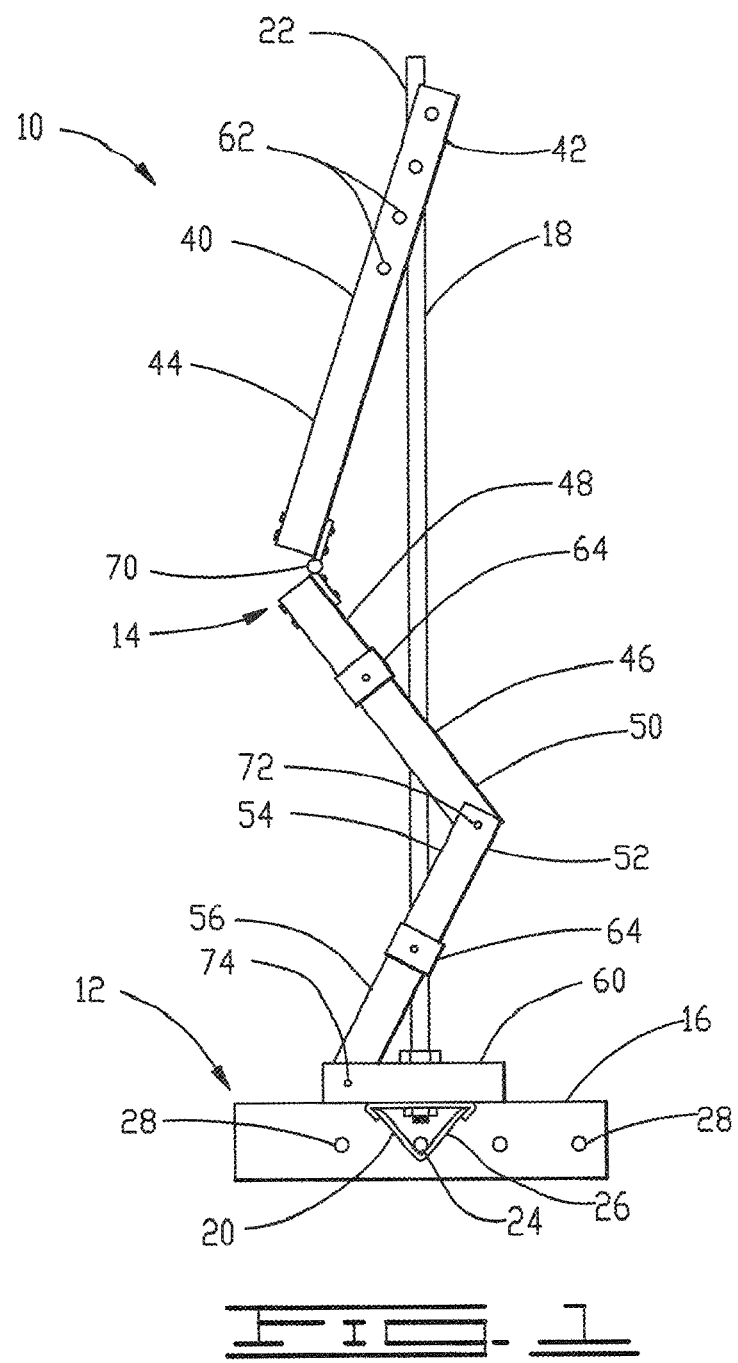
FIG. 1 is a side elevation view of a biomechanical system constructed in accordance with a preferred embodiment of the present invention.

With reference now to the drawings and to FIG. 1 in particular, there is shown therein a biomechanical system, designated by reference numeral 10, in accordance with a preferred embodiment of the present invention. The biomechanical system 10 comprises a pedestal 12 and biomechanical body model 14. The pedestal 12 provides support for the model 14 and allows the model to be displayed in a variety of positions. The pedestal 12 comprises a base support 16, a vertical post 18 or guide, and a horizontal foot support 20 or guide. The base support 16 preferably comprises a rectangular block of wood, but alternative shapes or materials are contemplated. The vertical post 18 preferably comprises a structurally sound post extending from the base support in a substantially vertical direction. The vertical post 18 may further comprise an adjustable model connection 22 adapted to facilitate connection of the body model 14. The adjustable model connection 22 may comprise a collar and set screw, a bolted clamp, or other similar mechanism. Use of the adjustable model connection 22 with the biomechanical body model 14 will reproduce the squatting motion with the model.

The horizontal foot support 20 preferably comprises a structurally sound post extending from the base support perpendicular to the vertical post and in a substantially horizontal direction. As shown in the preferred embodiment the foot support 20 may comprise a dowel or tube 24 connected to a length of angle iron 26, although other forms and materials are contemplated. The tube 24 of the foot support 20 allows for a connection to a receiving bore in the base support. In the preferred embodiment and in a standard position the vertical post 18 and the foot support 20 reside in the same plane. Alternative embodiments provide for the foot support 20 to extend from the base support 16 from a position forward of or behind the standard position. In the alternative embodiments the base support 16 defines additional connect points 28 for the foot support 20 to connect to and extend from the base support. Additionally, the connection of the foot support 20 to the base support 16 as shown will allow the foot support to be rotated relative to the base support (shown in FIG. 3) for advantageous positioning of the foot segment in a manner yet to be described.

The biomechanical body model 14 comprises a plurality of representative body segments connected by a plurality of representative joints. In the preferred embodiment the plurality of segments comprises a torso segment 40 having a top end 42 and a bottom end 44, an upper leg segment 46 having a first end 48 and a second end 50, a lower leg segment 52 having an upper end 54 and a lower end 56, and a foot segment 60. The torso segment 40 is adapted to be secured to the vertical post 18 proximate the top end 42 of the torso segment. Preferably the torso segment 40 is secured to the adjustable model connection 22 of the vertical post 18. Additionally, the torso segment 40 may comprise a plurality of adjustment positions 62 allowing for connection to the vertical post 12 at alternative positions along a length of the torso segment. One skilled in the art will appreciate the plurality of adjustment positions 62 effectively allows an operating length of the torso segment 40 to be manipulated. The adjustment allows demonstration of changes to center of mass influences or load placement on the body.

Each of the upper leg segment 46 and the lower leg segment 52 are preferably adjustable in length. Preferably the segments 46 and 52 are each comprised of at least two lengths of angle iron or other suitable material connected an adjustable connecting mechanism 64. As shown the adjustable connecting mechanism 64 comprises a bolting clamp, though alternative mechanisms such as spring clip push button fasteners or the like may be used. The adjustable nature of the upper leg segment 46 and the lower leg segment 52 allows the biomechanical body model 14 to additionally be adjusted to represent variations in skeletal proportions as desired.

Continuing with FIG. 1, the model further comprises a hip joint 70 between the torso segment 40 and the upper leg segment 46, a knee joint 72 between the upper leg segment 46 and the lower leg segment 52, and an ankle joint 74 between the lower leg segment 52 and the foot segment 60. The hip joint 70 is preferably connected to the bottom end 44 of the torso segment 40 and the first end 48 of the upper leg segment 46. More preferably the hip joint 70 is a multiaxial hinge, representing a multiaxial joint permitting relative movement of the upper leg segment 46 in multiple directions relative to the torso segment 40. The multiaxial hinge 70 permits rotation about a first axis and also enables rotation about a second axis that is orthogonal to the first axis. The knee joint 72 is preferably connected to the second end 50 of the upper leg segment 46 and the upper end 54 of the lower leg segment 52. The ankle joint 74 is preferably connected to the lower end 56 of the lower leg segment 52 and the foot segment 60. The knee joint 72 and the ankle joint 74 each preferably comprise a single axis joint such as a hinge permitting rotation about a single axis. More preferably the knee joint 72 and ankle joint 74 comprise a pin hinge or similar mechanism.

The foot segment 60 is connected to the horizontal foot support 20. Preferably the foot segment 60 is adjustably connected to the foot support 20 to allow adjustment of the position of the connection to the foot support in order to take advantage of the various possible movements of the biomechanical model 14. The adjustable connection is preferably a bolt or pin through the foot segment 60 and the foot support 20, though alternative mechanisms are contemplated. More preferably the foot segment 60 may be secured as shown in a first standard position, a position in which the biomechanical body model 14 is in a vertical plane with the torso segment 40, the upper leg segment 46, the lower leg segment 52, and the foot segment 60 each in the same plane. The adjustable connection for the foot segment 60 allows the foot segment to alternatively be moved to other positions along a length of the horizontal foot support 20 (shown in FIGS. 4 and 5).

With reference now to FIG. 2, shown therein is the biomechanical system 10 in an alternative configuration. As illustrated in FIG. 2, the torso segment 40 of the body model 14 is secured to the vertical post 18 at a relatively lower position compared to the position as shown in FIG. 1. The position of FIG. 2 allows the body model to represent a bent over position.

Turning now to FIG. 3, the biomechanical model 14 is shown with the foot support 20 rotated clockwise as compared to the position shown in FIG. 1. The rotation or pivoting of the foot support 20 represents elevation of the heel end 66 of the foot segment 60 and corresponding raising of the knee joint 72. The position changes demonstrate the "floor to knee" influence on the hip-knee relationship.

Referring now to FIGS. 4 and 5, the biomechanical system 10 is shown with the ability to demonstrate movement representative of hip abduction. As illustrated therein, the foot segment 60 is adjustably connected to the foot support 20 at a position some distance from the base support 16. The illustrated position of the foot segment 60 exercises the multiaxial movement of the hip joint 70, demonstrating hip abduction as the foot is moved from the centerline of the body.

With reference now to FIG. 6, shown therein is an alternative embodiment for the torso segment 40*a* of the body model 14. The torso segment 40*a* of the alternative embodiment comprises a flexible section 80 between the top end 42*a* and the bottom end 44*a* of the torso segment. The flexible section 80 may be comprised of flexible conduit or other material. The flexible section 80 permits illustration of mechanics related to a lumbar spine of the body. The alternative embodiment similarly includes the features of the top end 42*a* of the torso segment 40*a* and the hip joint 70 connected to the bottom end 44*a* of the torso segment 40*a*.

Referring now to FIGS. 7 and 8, an alternative embodiment for the pedestal 12 is illustrated therein. The pedestal 12 of the alternative embodiment comprises the base support 16, the vertical post 18, the horizontal foot support 18, and a base incline extension 82. The base incline extension 82, shown in plan view in FIG. 8, functions to elevate a back end 84 of the base support 16. The base incline extension 82 is preferably connected to a bottom side of the back end 84 of the base support 16. The base incline extension 82 may comprise a bracket or stand to support the back end 84 of the base support 16. Preferably, the base incline extension 82 will comprise a lateral arm 86 and at least one arm 88 extending perpendicularly from the lateral arm. The at least one arm 88 may be connected to the base support 16 by being inserted in a recess (not shown) in a bottom side of the base support. When the incline extension 82 is connected to the base support 16 as shown in FIG. 7, the back end 84 of the base support is elevated and the lateral arm 86 of the incline extension provides stability to the now inclined pedestal 12. With the base incline extension 82 as part of the pedestal 12, the biomechanical system 10 functions to emulate a squat rack system known as a "Smith Machine", and effects of the incline on the mechanics of body movement are demonstrated.

Turning now to FIGS. 9 and 10, an alternative embodiment for the biomechanical system 10 is shown. FIG. 9 illustrates the relative positioning and possible movement of the lower leg segment 52 and the foot segment 60 because of the ankle joint 74. In the alternative embodiment shown in FIG. 10, the body model 14 may comprise a dorsiflexion block 90 to limit the relative rotation between the foot segment 60 and the lower leg segment 52. The dorsiflexion block 90 as shown comprises a stop plate placed on the foot segment 60 and adjacent the ankle joint 74 to limit the available motion of the hinge of the ankle joint. The resulting limit to the rotation of the ankle joint 74 prevents the lower leg segment 52 from rotating down towards the foot segment 60. Alternative structures for the dorsiflexion block 90 are contemplated, such as a wedge or pin arrangement that limits ankle joint 74 rotation.

Figure 11:
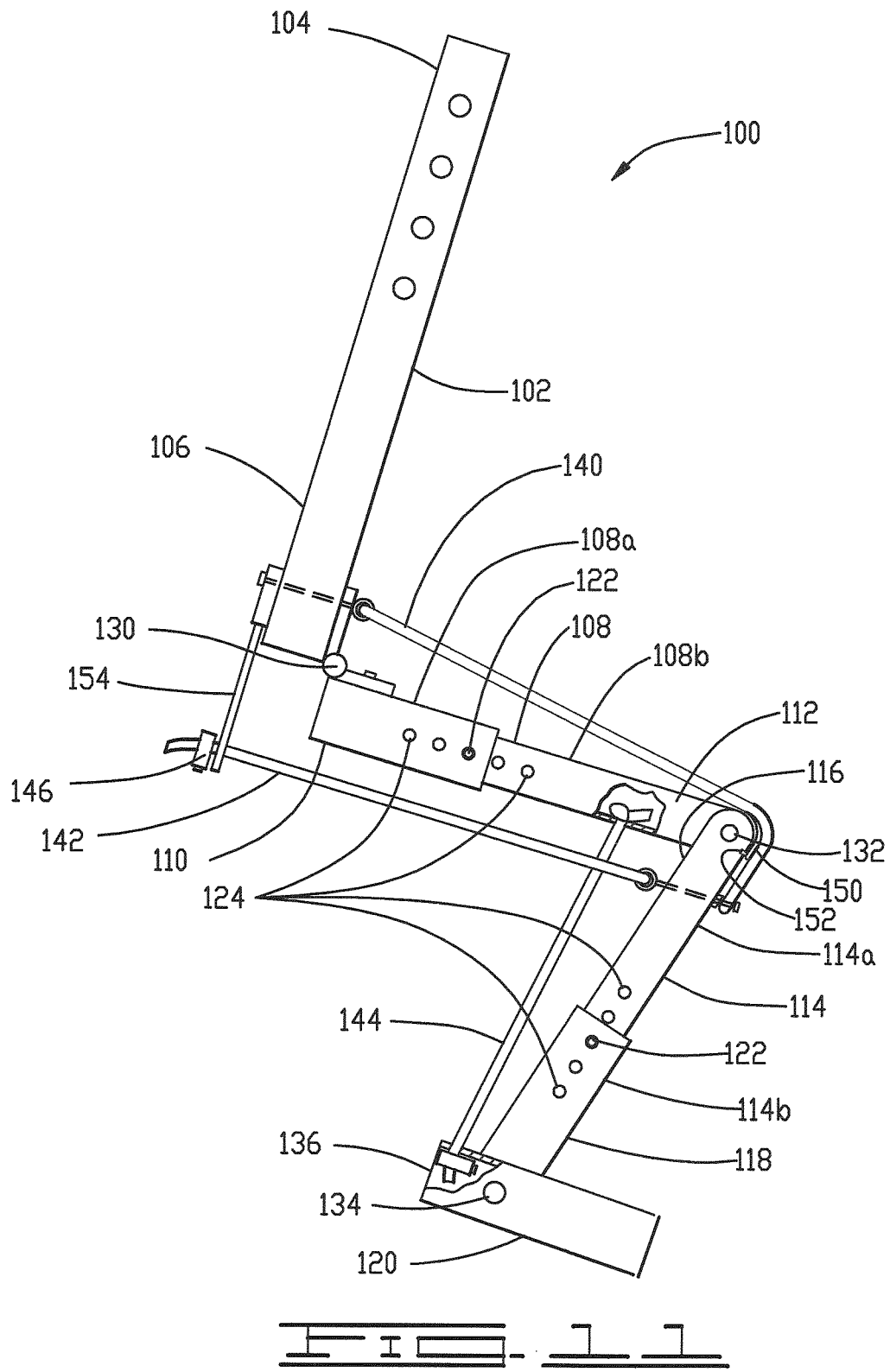
FIG. 11 is a side elevation of an alternative embodiment of the biomechanical model illustrating the use of multi-joint muscles.

With reference now to FIG. 11, shown therein is an alternative embodiment for a biomechanical body model 100. The body model 100 of FIG. 11 as illustrated for use independently and without benefit of the pedestal shown in previous embodiments, though the present embodiment may also be used with a pedestal as desired. The body model 100 of the present embodiment employs the use of multi-joint muscles to illustrate muscle actions in response to certain mechanical body movements. The biomechanical model 100 comprises a plurality of representative body segments connected by a plurality of representative joints. As illustrated the plurality of body segments comprises a torso segment 102 having a top end 104 and a bottom end 106, an upper leg segment 108 having a first end 110 and a second end 112, a lower leg segment 114 having an upper end 116 and a lower end 118, and a foot segment 120. In the preferred embodiment at least one of the upper leg segment 108 and the lower leg segment 114 are extendable, having an adjustable length. Preferably the segments 108 and 114 are comprised of at least two longitudinal pieces. More preferably the longitudinal pieces comprise a first longitudinal piece of square tubing 108a and 114a and a second longitudinal piece 108b and 114b. Most preferably the first piece 108a and 114a and the second piece 108b and 114b are telescopically arranged relative to each other.

Continuing with FIG. 11, the first piece 108a and the 114a is secured to the second piece 108b and 114b with an adjustable connection 122. Preferably the adjustable connection 122 comprises spring clip push button fasteners in slots 124 along a length of the first piece 108a and 114a and the second piece 108b and 114b. Alternative adjustment connections such as pins, bolts, or clamps are contemplated. The adjustable nature of the upper leg segment 108 and the lower leg segment 114 allows the biomechanical model 100 to additionally be adjusted to represent variations in skeletal proportions as desired.

The model of FIG. 11 further comprises a hip joint 130 between the torso segment 102 and the upper leg segment 108, a knee joint 132 between the upper leg segment 108 and the lower leg segment 114, and an ankle joint 134 between the lower leg segment 114 and the foot segment 120. The hip joint 130 is preferably connected to the bottom end 106 of the torso segment 102 and the first end 110 of the upper leg segment 108. More preferably the hip joint 130 is a multi-axial hinge, representing a multiaxial joint permitting relative movement of the upper leg segment 108 in multiple directions relative to the torso segment 102. The multiaxial hinge permits rotation about a first axis and also enables rotation about a second axis that is orthogonal to the first axis. It will be appreciated that the hip joint 130 permits an acute or obtuse angle between a front side of the torso segment 102 and a top side of the upper leg segment 108. Similarly, the hip joint 130 permits a reflex angle between a back side of the torso segment 102 and a bottom side of the upper leg segment 108.

The knee joint 132 is preferably connected to the second end 112 of the upper leg segment 108 and the upper end 116 of the lower leg segment 114. The knee joint 132 preferably comprises a hinge or rotating pin arrangement permitting rotation about a single axis. It will be appreciated that the knee joint 132 permits an acute angle to be formed between the bottom side of the upper leg segment 108 and the back side of the lower leg segment 114; while a reflex angle is created between the top side of the upper leg segment 108 and a front side of the lower leg segment 114. The ankle joint 134 is preferably connected to the lower end 118 of the lower leg segment 114 and to a rear portion 136 of the foot segment 120. The ankle joint 134 also preferably comprise a hinge or pin arrangement permitting rotation about a single axis.

Continuing with FIG. 11, the biomechanical model 100 further comprises a plurality of muscle segments 140, 142, and 144. The muscle segments 140, 142, and 144 preferably comprise an elastomer, such as a bungee cord, an elastic band, or other stretchable cord. The elastomers are preferably secured to the body segments using a cord lock 146, thus allowing a tension or useable length of the elastomer to be adjusted. Alternatively, the elastomers may be knotted or tied to eyebolts or through bores in the body segments.

Preferably the muscle segments comprise at least one multi-joint muscle. More preferably, the plurality of muscle segments will comprise a quadricep muscle 140, a hamstring muscle 142, and a calf muscle 144. Preferably the quadricep muscle 140 is attached at a first end to the bottom end 106 of the torso segment 102 and at a second end to the upper end 116 of the lower leg segment 114. More preferably, the quadricep muscle 140 will pass through the acute or obtuse angle of the hip joint 130, adjacent the top side of the upper leg segment 108, and through the reflex angle of the knee joint 132.

The body model 100 of the instant embodiment may also comprise a patella segment 150 removably connected to the upper end 116 of the lower leg segment 114 and adjacent the knee joint 132. The patella segment 150 preferably comprises a curved plate and a tab 152 extending from a first end of the plate. The tab 152 of the plate is preferably inserted into a slot in the upper end 116 of the lower leg segment 114 to position the patella segment. Alternatively, the tab 152 of the patella segment 150 may be positioned for insertion in a slot in the second end 112 of the upper leg segment 108. Additionally, the patella segment 150 may be secured in place with a hinge or positioned to retract into the upper leg segment 108 or the lower leg segment 114. The patella segment 150 understandably represents a knee of the body and allows the quadricep muscle 140 to smoothly pass through the reflex angle of the knee joint 132. The removable nature of the patella segment 150 allows additional demonstration of impact of body mechanics on the quadricep muscle 140. Additionally the position of the patella segment allows for the quadricep muscle passes across and contacts the patella segment.

Similarly, the hamstring muscle 142 preferably is attached at a first end proximate the bottom end 106 of the torso segment 102 and at a second end to the upper end 116 of the lower leg segment 114. Preferably the body model 100 may comprise a tail bone 154 secured to the bottom end 106 of the torso segment 102, providing a more direct connection point for the first end of the hamstring muscle 142. More preferably, the hamstring muscle 142 will pass through the reflex angle of the hip joint 130, along the bottom side of the upper leg segment 108, and through the acute or obtuse angle of the knee joint 132. The calf muscle 144 is preferably connected at a first end to the second end 112 of the upper leg segment 108 and at a second end to the rear portion 136 of the foot segment 120. More preferably, the calf muscle 142 passes through the acute or obtuse angle of the knee joint 132, along the back side of the lower leg segment 114, and to the foot segment 120.

Continuing with FIG. 11, the present embodiment of the body model 100 may further comprise at least one single joint muscle. The single joint muscle may comprise an elastomer representing the human soleus muscle as shown in FIG. 11 crossing only the ankle joint 134. The soleus single joint muscle is connected at a first end to the upper end 116 of the lower leg segment 114 and at a second end to the rear end 136 of the foot segment 120. Use of the single joint muscle allows for direct comparison to the adjacent multi-joint calf muscle 144, for recognition of the impact of body mechanics on the various muscles. It will be appreciated that other single joint muscles could similarly be implemented.

Various modifications can be made in the design and production of the present invention without departing from the spirit thereof. Thus, while the principal preferred construction and use of the invention have been explained in what is now considered to represent its best embodiments, it should be understood that the invention may be practiced otherwise than as specifically illustrated and described, and claimed in the following claims.

What is claimed is:

1. A biomechanical system comprising:
 a pedestal comprising a base and a vertical post; and
 a biomechanical body model comprising:
  a torso segment having a top end and a bottom end, the top end connected to the post;
  an upper leg segment having a first end and a second end;
  a lower leg segment having an upper end and a lower end; and
  a foot segment connected to the base;
  a hip joint connected to the bottom end of the torso segment and the upper leg segment;
  a knee joint connected to the upper leg segment and the lower leg segment; and
  an ankle joint connected to the lower leg segment and the foot segment;
  wherein the hip joint is a multiaxial joint; and
  wherein the knee joint and the ankle joint are single axis joints;
  wherein the vertical post and the torso segment are substantially disposed in a vertical plane;
  wherein the pedestal further comprises a foot support, the foot support connected to and extending from the base substantially horizontally, such that the foot support is substantially perpendicular to the vertical plane of the vertical post and the torso segment.

2. The biomechanical system of claim 1 wherein the foot segment is adjustably secured to the foot support.

3. The biomechanical system of claim 2 wherein the foot segment is adapted to be moved along a length of the foot support such that the hip joint exercises a multiaxial movement.

4. The biomechanical system of 1 wherein the foot support is adapted to rotate in a vertical plane.

5. The biomechanical system of claim 1 wherein the foot support and the vertical post are in the same plane.

6. The biomechanical system of claim 1 wherein the base further comprises an incline extension, the incline extension adapted to elevate a back end of the base.

7. The biomechanical system of claim 6 wherein the incline extension comprises a bracket attached to the back end of the base.

8. A biomechanical system comprising:
 a pedestal comprising a base and a vertical post; and
 a biomechanical body model comprising:
  a torso segment having a top end and a bottom end, the top end connected to the post;
  an upper leg segment having a first end and a second end;
  a lower leg segment having an upper end and a lower end; and
  a foot segment connected to the base;
  a hip joint connected to the bottom end of the torso segment and the upper leg segment;
  a knee joint connected to the upper leg segment and the lower leg segment; and
  an ankle joint connected to the lower leg segment and the foot segment;
  wherein the hip joint is a multiaxial joint; and
  wherein the knee joint and the ankle joint are single axis joints;
 wherein the vertical post and the torso segment are substantially disposed in a vertical plane; and
 wherein the body model further comprises a removable dorsiflexion block adapted to limit available movement of the ankle joint.

9. The biomechanical system of claim 8 wherein the dorsiflexion block comprises a plate positioned on the foot segment and adjacent the ankle joint.

* * * * *